Sept. 24, 1968  J. L. MATUT ARCHANCO  3,402,622
AUTOMATIC AND CONTROLLABLE MECHANICAL
CONTINUOUS TRANSMISSION SYSTEM
Filed May 16, 1966  3 Sheets-Sheet 1
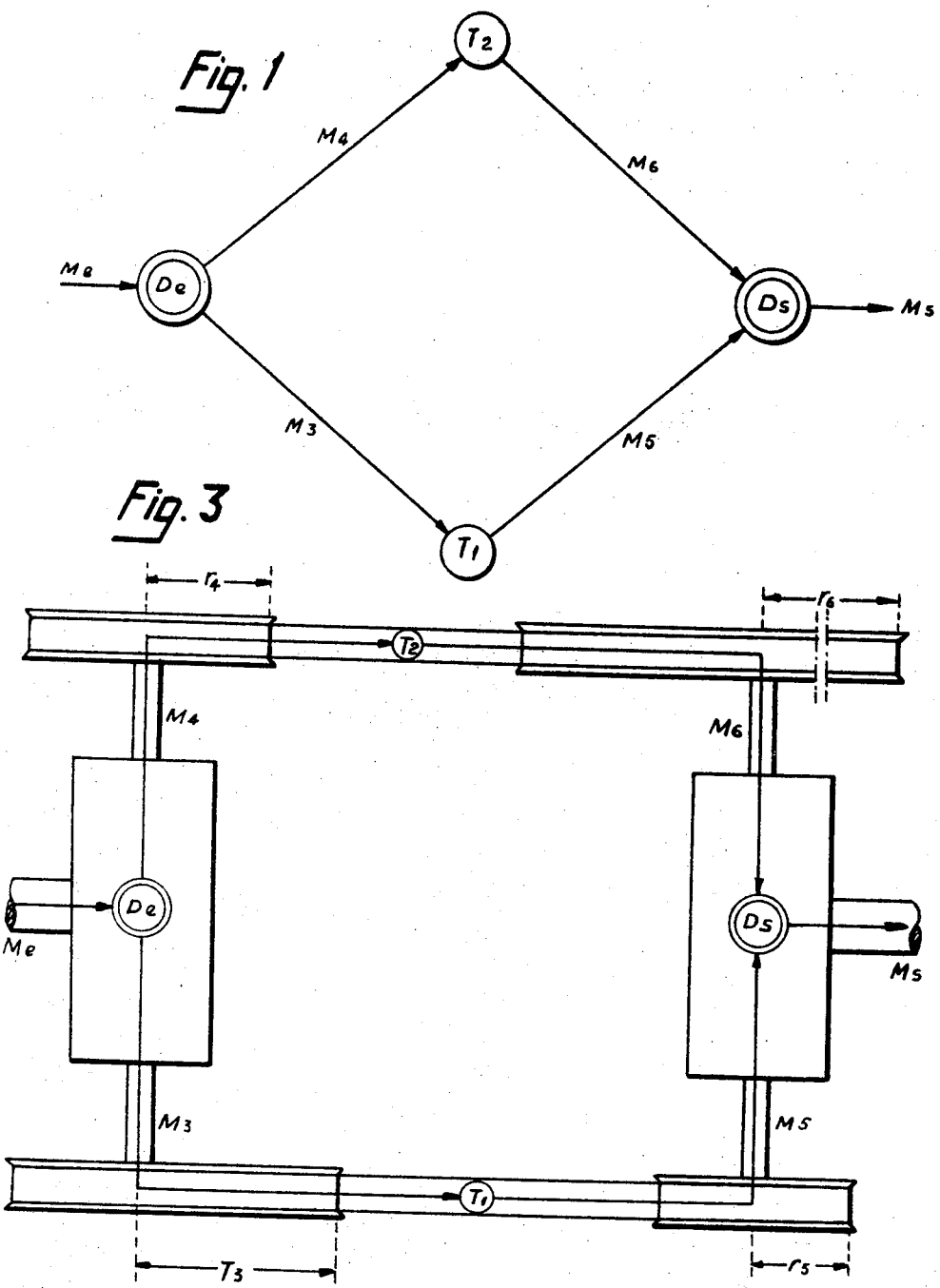
INVENTOR
José Luis MATUT ARCHANCO
BY
Wenderoth, Lind and Ponack
attorneys Sept. 24, 1968     J. L. MATUT ARCHANCO     3,402,622
AUTOMATIC AND CONTROLLABLE MECHANICAL
CONTINUOUS TRANSMISSION SYSTEM
Filed May 16, 1966     3 Sheets-Sheet 2
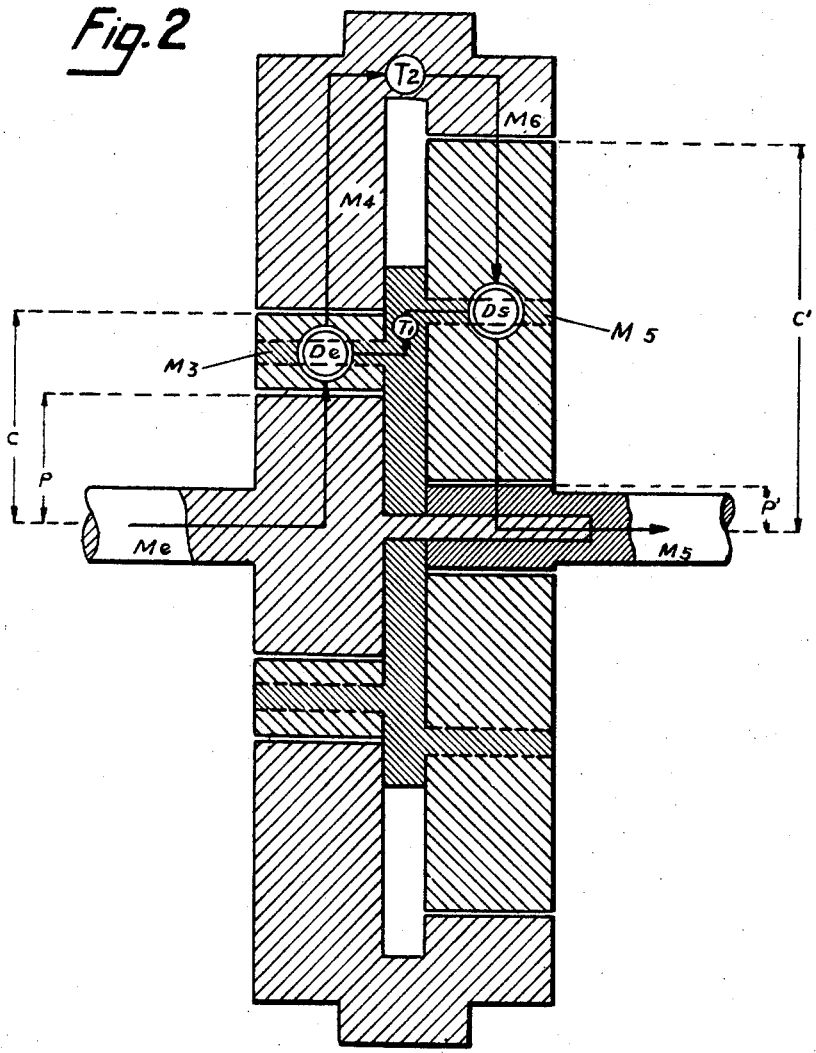
INVENTOR.
Jose Luis MATUT ARCHANCO
BY Wenderoth, Lind + Ponack
attorneys

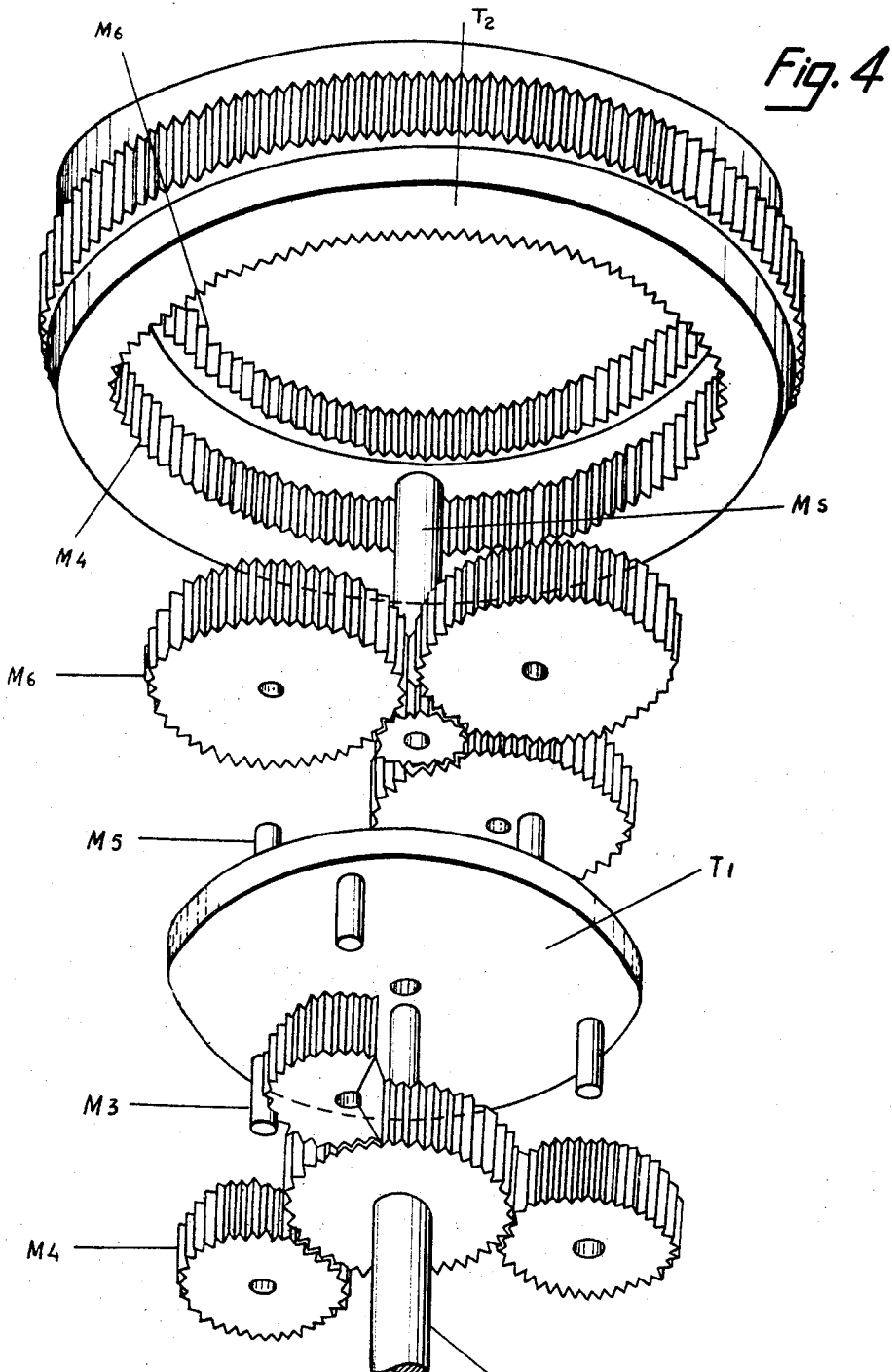

United States Patent Office 3,402,622
Patented Sept. 24, 1968

3,402,622
AUTOMATIC AND CONTROLLABLE MECHANICAL CONTINUOUS TRANSMISSION SYSTEM
José Luis Matut Archanco, Avenida de Nazaret 6, Madrid, Spain
Filed May 16, 1966, Ser. No. 550,468
Claims priority, application Spain, Jan. 28, 1966, 322,388
7 Claims. (Cl. 74—801)

ABSTRACT OF THE DISCLOSURE

A mechanical system of automatic, continuous and controllable transmission comprising a driving shaft having the sun gear of a first epicyclic differential. A driven shaft having the sun gear of a second epicyclic differential. Two corresponding sets of planet gears and a component into which are set all the planet-carrier axles of both said sets. An orbit gear has two internal coaxial rows of teeth. The two casings mounted on the orbit gear enclose and operate the sun gears and the corresponding driving and driven planet gears thereby forming a transmission wherein the elements are mobile with the trajectories of every part of every one of the components running in parallel planes and perpendicular to all the axes and the driving sun gear meshes with its corresponding planet gears, which in turn, mesh with the corresponding ring of teeth in the orbit gear, and then rotate about their fixed planet-carrier axles so that due to the "rotation" and "translation" of said planet gears, the revolutions of said driving sun gear causes said orbit gear and planet carrier to rotate, and due to said driven planet gears, the revolutions of said orbit gear and said planet-carrier produce the movement of said driven sun gear.

---

This invention refers to an automatic and controllable mechanical continuous transmission system.

It is often necessary to rely on machinery where both the angular speeds and the torques are subject to considerable variance and furthermore, the main source of energy of such machinery can only work with a fair efficiency at certain speed ratings of the driving shaft, and only within a very limited range of speeds.

A good example of this is the automobile with an internal combustion engine having a gear-box. This is hardly the ideal solution to the problem, since it is extremely difficult for the engine to reach maximum power, maximum drive, or minimum fuel consumption. The reason is that most gear-boxes possess only a finite number of transmission ratios, whereas the driven shaft speeds cover an infinite number of values over a very large range of speeds. In those few gear-boxes which permit an infinite number of transmission ratios, the ratio must operate within a range of values which offers insufficient scope, while the maximum power which may be transmitted is also extremely limited.

A great many possible solutions have been tried out: the Wilson epicyclics, turbo-clutches, hydromatics, torque converters, dynaflows, variomatics, etc. . . . but these all have their drawbacks, such as limited automatism, high fuel consumption or extremely complex construction. They are also difficult to maintain since they require complicated assemblage and they have a low level of efficiency and tend to show premature signs of wear, or there is a strict limit to the amount of power which can be transmitted. It is an object of the invention to remove these disadvantages.

A further object of the present invention is to provide a system whereby transmission ratios will acquire absolute continuity, as well as complete automatism, which may be controlled at will. A mechanical system is provided which converts the angular speed of the driving shaft into the angular speed of the driven shaft without there being any fixed or given ratio between the two and it may be any one of an infinite range. It will automatically make the corresponding adjustments, according to the stresses and counter-stresses to which it is subjected. Furthermore, if so desired, coupled controls may be added at will. This continuity is achieved due to the fact that the ratio of the angular speeds, by means of a gradual and continuous process, can take any one—or all—of the real values which lie between plus infinity and minus infinity.

A further object is to provide a construction wherein automatism is obtained by having the frictions produced between the various components in contact being a function of their relative speeds, and, therefore, they automatically determine the corresponding transmission ratio, in accordance with the demands made on the system.

The controllability factor is based on any auxiliary power supply-cum-sump, which is simply connected to the system and applied at will. In this way, the amount of energy supplied can be increased or decreased as desired.

The addition of this power supply-cum-sump completes a transmission system which is capable of performing the following operations simultaneously: gear-changes, including the reverse gear; the clutch; braking, starting the engine. These various manoeuvres can all be carried out in a continuous, automatic and controllable manner. This system has a very wide range of application in automobiles, in controlling applied forces, in stabilizing all types of engines, in limiting torques, in mechanical fuses, etc.

A further object is to provide a system having two separate mechanisms with two degrees of kinematic freedom. In this way, it will be possible to establish the angular speeds of the driving and driven shafts quite independently and so have access to the infinite range of transmission ratios which are theoretically possible. The frictions themselves determine the exact transmission ratio quite automatically, while the connection of the power supply-cum-sump facilitates the arbitrary selection of a particular transmission ratio. The fact that the main source of energy operates at maximum efficiency more than compensates for that fraction of the energy which is lost through friction.

With the above and other objects in view as will become apparent from the detailed description below, two preferred modifications of the invention are shown in the drawings in which:

FIGURE 1 is a diagram illustrating the components of the invention.

FIGURE 2 is a schematic cross-sectional view of the driving shaft and cooperating elements showing one form of the invention.

FIGURE 3 is a diagrammatic view illustrating another form of the invention, and

FIGURE 4 is a fragmentary perspective view of the construction shown in FIGURE 2.

FIGURE 1 shows the general layout of this invention. This consists of two differential mechanisms $D_e$ and $D_s$, which have two degrees of kinematic freedom each. There are also two normal transmission mechanisms $T_1$ and $T_2$, which each have one degree of kinematic freedom. The end of the driving shaft $M_e$ and the ends of the two shafts $M_3$ and $M_4$ all meet in the differential taking-in mechanism $D_e$. The end of the driven shaft $M_s$ and the ends of the two shafts $M_5$ and $M_6$ all meet in the differential drawing-out mechanism $D_s$. The other ends of shafts $M_3$ and $M_5$ meet at the normal transmission mechanism $T_1$, while the other ends of shafts $M_4$ and $M_6$ meet at the normal transmission mechanism $T_2$. Since shafts $M_e$, $M_3$, $M_4$, $M_5$, $M_6$, and $M_s$ have six angular speeds, and the mechanisms $D_e$, $D_s$, $T_1$ and $T_2$ have four kinematic conditions, the system has two degrees of freedom in principle. Since this is so, it becomes possible to establish the angular speeds of the driving shaft $M_e$ and the driven shaft $M_s$ with total kinematic independence. It has been stated that, in principle, the system has two degrees of freedom. It can also be dimensioned in such a way that there will be only one degree of freedom. In that case, if the angular speed of the driving shaft $M_e$ were established, it would determine the angular speed of the driven shaft $M_s$. What this means, in mathematical terms, is that a system, of four equations with six unknowns, has a theoretical number of solutions to the extent of infinity squared; on the other hand, it is also possible to prepare a system, of four equations with six unknowns, in such a way that the number of solutions will simply be infinity. The dynamic automatism of this system is due entirely to the possibility of geometrically dimensioning it to conform with measurements which are similar—but not identical—to those which reduce it to a single degree of kinematic freedom. When wishing to make the system controllable, all that is required is to make the auxiliary power supply-cum-sump act on any of the four shafts $M_3$, $M_4$, $M_5$ or $M_6$. The two practical applications which now follow will encompass and clarify all that has been said with respect to the FIGURE 1 scheme.

FIGURE 2 shows a cross-section of the driving-shaft $M_e$ and the driven shaft $M_s$ in the first application. FIGURE 4 shows the fragmentary perspective of the same. For reasons of clarity in the drawings, FIGURES 2 and 4 do not show the casing of $T_2$, which closes the fixed, but rotatable box which guides and motivates the whole system. For the same reason, and also because there is no need for it when the automatic transmission is in operation, the auxiliary power supply-cum-sump has been omitted. Nevertheless, as can be seen in FIGURE 4, $T_2$ has an exterior gearwheel, thereby demonstrating that the auxiliary power supply-cum-sump can quite easily be connected. Although the interior gearwheels of $T_2$ may seem identical in FIGURE 4, there is no reason for this being the case, as may be appreciated in FIGURE 2.

Likewise, since they are not essential for understanding the invention the following parts have also been omitted: the main power supply which drives the driving shaft, and the supports of the driving and driven shafts $M_e$ and $M_s$ of the transmission.

Referring to FIGURE 2, and the fragmentary perspective of FIGURE 4, the first application will now be explained.

When the driving shaft $M_e$ rotates, by means of driving planet gears, it forces the axles $M_3$ of these same planet gears to rotate in what could well be called circular "translation," while the actual planet gears rotate about their axes in what is commonly known as orbital "rotation." The "translation" of the axles $M_3$ will rotate the planet-carrier $T_1$, in which they are set. As the planet gears rotate about their axes $M_3$, the orbit gear $T_2$ will rotate with respect to $T_1$. In other words, by means of the planet gears, the revolutions of the driving shaft $M_e$ cause the eventual movement of the orbit gear $T_2$ and the planet-carrier $T_1$. Reciprocally, and as a result of a process which is essentially symmetrical, the movements of the orbit gear $T_2$ and the planet-carrier $T_1$ will cause the driven shaft $M_s$ to rotate, by means of the driven planet gears.

In order to give a better idea of how the system works, two particular cases may be chosen, where, first of all, the orbit gear $T_2$ will not rotate, and second, where the planet-carrier $T_1$ will not rotate. This is what will happen in the first case: when the orbit gear $T_2$ is stopped, the revolutions of the driving shaft $M_e$ will cause the planet-carrier $T_1$ to rotate, by means of the driving planet gears. This, in turn, will act upon the driven shaft $M_s$, by means of the driven planet gears. In the second case, when the planet-carrier is stopped, the driving shaft $M_e$ will cause the orbit gear $T_2$ to rotate, by means of the planet gears, which will only be able to rotate about their own fixed axles $M_3$ and $M_5$. The movement which has been transmitted to the orbit gear $T_2$, will now be passed on to the driven planet gears, which since they are also on fixed axles $M_5$, will start to turn the driven shaft $M_s$.

These two cases, which demonstrate the kinematic operation of the system, are by no means extreme. For example, if the system, according to the fragmentary perspective of FIGURE 4, were made to act on the orbit gear $T_2$ (or any other auxiliary component), it would be possible to obtain any speed rating at all in the rotation of the planet gears about their axles $M_3$ and $M_5$, in the subsequent movements of these shafts $M_3$ and $M_5$ and the planet-carrier $T_1$, and consequently, of greatest importance, in the revolutions of the driven shaft $M_s$.

Obviously, the angular speeds of the driving and driven shafts $M_e$ and $M_s$ can be determined with priority, without there being any kinematic constraint, provided that $c/p$ is different from $c'/p'$ (FIGURE 2). If these two quantities were the same, however, then the driving and driven shafts $M_e$ and $M_s$ would have a fixed kinematic ratio.

On the other hand, as these two quantities approach each other, the revolutions of the planet-carrier $T_1$ and the orbit gear $T_2$ become greater, although the revolutions of the driving and driven shafts $M_e$ and $M_s$ remain constant. This explains why, without there being any action on the orbit gear $T_2$, the transmission is *automatic*, since the total torque of the internal frictions is a function of the relative velocities of the components which are in contact.

It should be pointed out that, when the transmission is automatic, all that is required is one support at the driving shaft and another at the driven shaft. Consequently, there will be no reaction torque whatsoever. Obtaining transmission in this way (when the system operates automatically) is quite new, although there is the drawback that the main power supply cannot transmit greater torque than its own maximum.

Any auxiliary power supply (which can be as small as desired, with respect to the main ingoing source of energy) which acts on the orbit gear $T_2$ for example, can produce any speed ratio at all between the driving and driven shafts. This is the justification for using the term *controllable*.

Since, as has already been described, the rotations of the driving shaft act on the orbit gear $T_2$ and the planet-carrier $T_1$, and the subsequent motion of these causes the driven shaft $M_s$ to rotate, there is an infinite number of possible ratios. As the operation takes place in a gradual, nonstop manner, the transmission may be described as *continuous*.

The roles of the driving, driven and auxiliary movements can quite easily be interchanged, both in the general application of the system, as well as in the two examples just given. The only absolutely essential requirement is that there be two degrees of freedom: that one of the six movements be "driving" and another be "outgoing," while the auxiliary power supply-cum-sump acts on one of the other four movements.

Variations in some details may also be introduced into the essential features of this invention: there is no fixed limit to the number of planet gears in each set (FIG. 2 shows an even number of planet gears in each of the two sets, whereas FIG. 4 reveals sets of three with axes turned through 60°); there is no particular radius ratio; it is possible to effect movement in the orbit gear or in the pulley in different ways, in accordance with the example under consideration (or in any part of the system whose movement is affected); there is complete freedom in the choice of distribution and transmission components, as regards their shape, size and relative arrangement; nor is any specification made as regards the materials from which they may be constructed.

FIG. 3 shows the second useful application of this system. Once the first practical use has been understood (see FIG. 1), the second one becomes quite clear, since it is much less complicated. The only features worth pointing out are the following: in the first example, the differential mechanisms $D_e$ and $D_s$ are epicyclic, and, in the second example, they are ordinary differential mechanisms, such as may be found on the rear-axle of an automobile. Also, in the first case, each of the transformations of $T_1$ and $T_2$ is an identity, since the axles of the driving and driven planet-carriers are rigidly fixed, as are the two rings of teeth inside the orbit gear. In that first example, in order that there would be two degrees of kinematic freedom, it was required that $c/p$ should not be the same as $c'/p'$ (FIG. 2). In this second case, in order to satisfy this same condition, it is necessary for $r_3/r_4$ to be different from $r_5/r_6$ (FIG. 3).

What I claim is:

1. A mechanical system of automatic, continuous and controllable transmission comprising a driving shaft having the sun gear of a first epicyclic differential, a driven shaft having the sun gear of a second epicyclic differential, two corresponding sets of planet gears, a component into which are set all the planet-carrier axles of both said sets, an orbit gear having two internal coaxial rows of teeth, two casings mounted on said orbit gear enclosing and operating said suns and the corresponding driving and driven planet gears thereby forming a transmission wherein the elements are mobile with the trajectories of every part of every one of the components running in parallel planes and perpendicular to all the axes and said driving sun gear meshes with its corresponding planet gears, which in turn, mesh with the corresponding ring of teeth in said orbit gear, and then rotate about their fixed planet-carrier axles so that due to the "rotation" and "translation" of said planet gears, the revolutions of said driving sun gear causes said orbit gear and planet carrier to rotate, and due to said driven planet gears, the revolutions of said orbit gear and said planet-carrier produce the movement of said driven sun gear.

2. A system in accordance with claim 1 wherein the quotient between the diameter of said driving sun gear and the diameter of the corresponding ring on said orbit gear, and the quotient between the diameter of said driven sun gear and the diameter of the corresponding ring on said orbit gear are such that their difference can be as small as required above zero and the nearer this difference approaches zero, the greater will be the angular speeds of all said planet gears, said orbit gear and said planet-carrier, for a given difference between the angular speed of said driven shaft and the angular speed of said driving shaft and when the difference between the angular speed of said driven shaft and the angular speed of said driving shaft increases, then the angular speeds of all said planet gears, said orbit gear and said planet-carrier will also increase, whereby if the internal frictions within the system, tending to minimize the revolutions of said driven shaft with respect to said driving shaft, start to increase when the difference between the quotients of the radii decreases and also start to increase just when the difference between the angular speed of said driven shaft and the angular speed of said driving shaft tries to increase, then the system is automatic.

3. A system in accordance with claim 1 wherein in order to obtain a particular transmission ratio an auxiliary system is coupled to said orbit gear to modify its angular speed.

4. A system in accordance with claim 1 wherein said two sets of axles of said planet gears are attached to a plate and an auxiliary system is coupled to said plate to modify its angular speed.

5. A mechanical system of automatic, continuous and controllable transmission having only four linkages comprising a driving shaft, a driven shaft, a first and second differential, a first and second mechanical transmission, one of the three axes of said first differential forming said driving shaft; one of the three axes of said second differential forming said driven shaft; each of said transmissions linking one axis of said first differential and one axis of said second differential, thereby transforming their angular speeds whereby the ratio between the angular speed of said driven shaft and the angular speed of said driving shaft can be any one of the real values between plus infinity and minus infinity to make a continuous system.

6. A system in accordance with claim 5 wherein the difference between the ratios of multiplication and de-multiplication in said two transmissions is as small as required above zero.

7. A system in accordance with claim 5 wherein an auxiliary system is provided to modify the angular speed of said differentials and transmissions to manually control the same.

References Cited

UNITED STATES PATENTS

| | | | |
|---|---|---|---|
| 748,412 | 12/1903 | Norris | 74—801 X |
| 1,970,251 | 8/1934 | Rossman | 74—801 |
| 2,862,407 | 12/1958 | Lutz | 74—785 X |
| 2,896,480 | 7/1959 | Michie | 74—801 X |
| 3,203,275 | 8/1965 | Hoover | 74—801 X |
| 2,103,259 | 12/1937 | Hitt | 74—675 |
| 3,307,426 | 3/1967 | Whitaker | 74—675 |

FRED C. MATTERN, Jr., *Primary Examiner.*

ARTHUR T. McKEON, *Assistant Examiner.*